US010633608B2

(12) United States Patent
Hishinuma et al.

(10) Patent No.: US 10,633,608 B2
(45) Date of Patent: Apr. 28, 2020

(54) LUBRICANT COMPOSITION

(71) Applicants: NOK KLUEBER CO., LTD., Tokyo (JP); NSK LTD., Tokyo (JP)

(72) Inventors: Takeshi Hishinuma, Ibaraki (JP); Keita Nakashi, Ibaraki (JP); Nobuaki Izawa, Kanagawa (JP); Miwa Komatsu, Kanagawa (JP)

(73) Assignees: NOK KLUEBER CO., LTD., Tokyo (JP); NSK LTD., Tokyo (JP)

( * ) Notice: Subject to any disclaimer, the term of this patent is extended or adjusted under 35 U.S.C. 154(b) by 0 days.

(21) Appl. No.: 15/995,244

(22) Filed: Jun. 1, 2018

(65) Prior Publication Data
US 2018/0273871 A1 Sep. 27, 2018

Related U.S. Application Data

(63) Continuation of application No. PCT/JP2016/084911, filed on Nov. 25, 2016.

(51) Int. Cl.
*C10M 169/00* (2006.01)
*C10M 107/38* (2006.01)
(Continued)

(52) U.S. Cl.
CPC ........ *C10M 107/38* (2013.01); *C10M 119/22* (2013.01); *C10M 129/74* (2013.01);
(Continued)

(58) Field of Classification Search
CPC .............. C10M 107/38; C10M 169/06; C10M 141/10; C10M 133/20; C10M 129/74;
(Continued)

(56) References Cited

U.S. PATENT DOCUMENTS

2003/0069144 A1 4/2003 Iso
2004/0198612 A1 10/2004 Asao et al.
(Continued)

FOREIGN PATENT DOCUMENTS

CN 1385624 A 12/2002
CN 101622333 A 1/2010
(Continued)

OTHER PUBLICATIONS

English Translation of Written Opinion for corresponding International Application No. PCT/JP2016/084911 dated Jan. 10, 2017.
(Continued)

*Primary Examiner* — Taiwo Oladapo
(74) *Attorney, Agent, or Firm* — Pearne & Gordon LLP

(57) ABSTRACT

A lubricant composition includes a perfluoropolyether as a base oil, a fluororesin as a thickener, and a polyol ester, a urea grease and a zinc dialkyldithiophosphate as additives, wherein a mass ratio of content of the perfluoropolyether to total content of the polyol ester and the urea grease ranges from 78/22 to 95/5, a mass ratio of content of the perfluoropolyether to content of the polyol ester ranges from 90/10 to 96.5/3.5, a mass ratio of content of the polyol ester to content of the urea grease ranges from 40/60 to 65/35, content of the fluororesin ranges from 15 mass % to 24 mass % based on a total amount of the lubricant composition, and content of the zinc dialkyldithiophosphate ranges from 0.5 mass % to 4 mass % based on the total amount of the lubricant composition.

8 Claims, 2 Drawing Sheets

(51) Int. Cl.
  *C10M 169/06* (2006.01)
  *C10M 119/22* (2006.01)
  *C10M 129/74* (2006.01)
  *C10M 133/20* (2006.01)
  *C10M 141/10* (2006.01)
  *F16C 19/06* (2006.01)
  *F16C 33/66* (2006.01)

(52) U.S. Cl.
  CPC ........ *C10M 133/20* (2013.01); *C10M 141/10* (2013.01); *C10M 169/06* (2013.01); *C10M 2205/0285* (2013.01); *C10M 2207/1276* (2013.01); *C10M 2207/1285* (2013.01); *C10M 2207/283* (2013.01); *C10M 2207/2825* (2013.01); *C10M 2207/2835* (2013.01); *C10M 2213/0606* (2013.01); *C10M 2213/0626* (2013.01); *C10M 2215/1026* (2013.01); *C10M 2223/045* (2013.01); *C10N 2220/022* (2013.01); *C10N 2220/082* (2013.01); *C10N 2230/06* (2013.01); *C10N 2230/08* (2013.01); *C10N 2240/02* (2013.01); *C10N 2250/10* (2013.01); *F16C 19/06* (2013.01); *F16C 33/66* (2013.01)

(58) Field of Classification Search
  CPC ........ C10M 119/22; C10M 2205/0285; C10M 2223/045; C10M 2215/1026; C10M 2207/1285; C10M 2207/283; C10M 2207/2835; C10M 2213/0606; C10M 2207/1276; C10M 2207/2825; C10M 2213/0626; C10N 2250/10; C10N 2220/082; C10N 2230/08; C10N 2220/022; C10N 2230/06; C10N 2240/02; F16C 33/66; F16C 19/06
  See application file for complete search history.

(56) References Cited

U.S. PATENT DOCUMENTS

2006/0252655 A1* 11/2006 Iso .................. B82Y 30/00
                                                    508/154
2007/0213240 A1   9/2007  Shimura et al.
2007/0287646 A1  12/2007  Kawamura et al.

FOREIGN PATENT DOCUMENTS

| | | |
|---|---|---|
| CN | 103571587 A | 2/2014 |
| JP | 2000-303088 A | 10/2000 |
| JP | 2003-096480 A | 4/2003 |
| JP | 2004-003596 A | 1/2004 |
| JP | 2004-028326 A | 1/2004 |
| JP | 2004-339245 A | 12/2004 |
| JP | 2006-045577 A | 2/2006 |
| JP | 2007-217464 A | 8/2007 |
| JP | 2009-035590 A | 2/2009 |
| JP | 2012-236935 A | 12/2012 |
| JP | 2014-019840 A | 2/2014 |
| WO | 2005/097955 A1 | 10/2005 |

OTHER PUBLICATIONS

English Translation of International Preliminary Report on Patentability for corresponding International Application No. PCT/JP2016/084911 dated Jun. 5, 2018.
Chinese Office Action dated Dec. 24, 2018 for corresponding Chinese Application No. 201680070140.3 and English translation.
International Search Report for corresponding International Application No. PCT/JP2016/084911 dated Jan. 10, 2017.
Written Opinion for corresponding International Application No. PCT/JP2016/084911 dated Jan. 10, 2017.
Decision to Grant for corresponding Japanese Application No. 2017-506803.
Extended European Search Report dated Mar. 29, 2019 for corresponding European Application No. 16870539.0.

\* cited by examiner

[Figure 1]
(a)
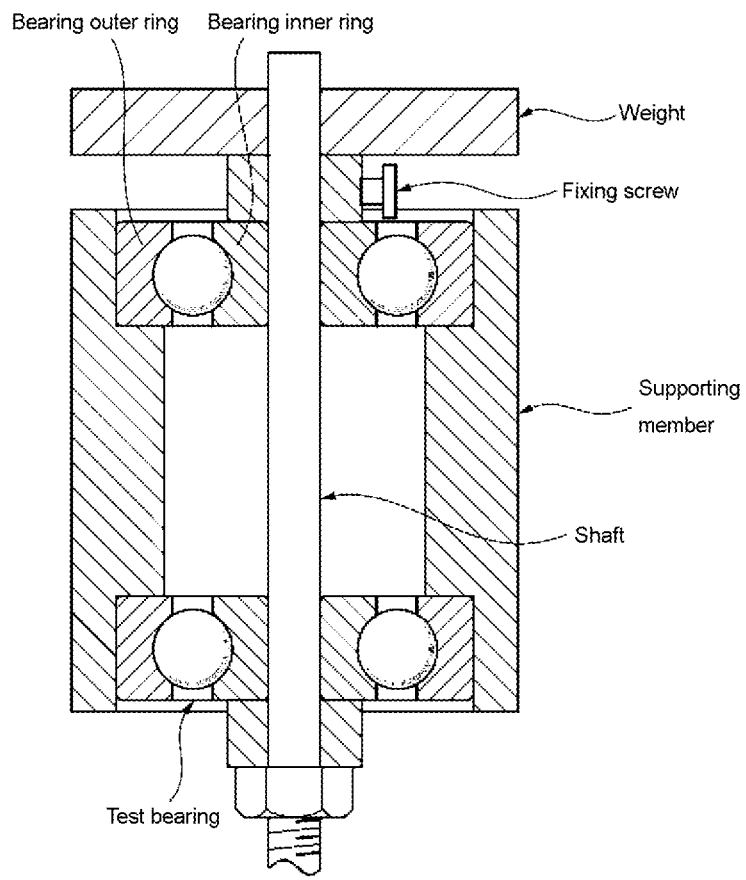
(b)
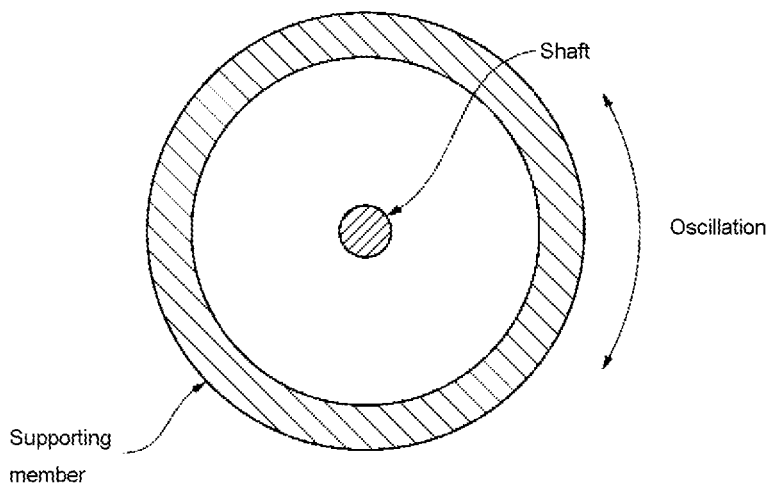

[Figure 2]
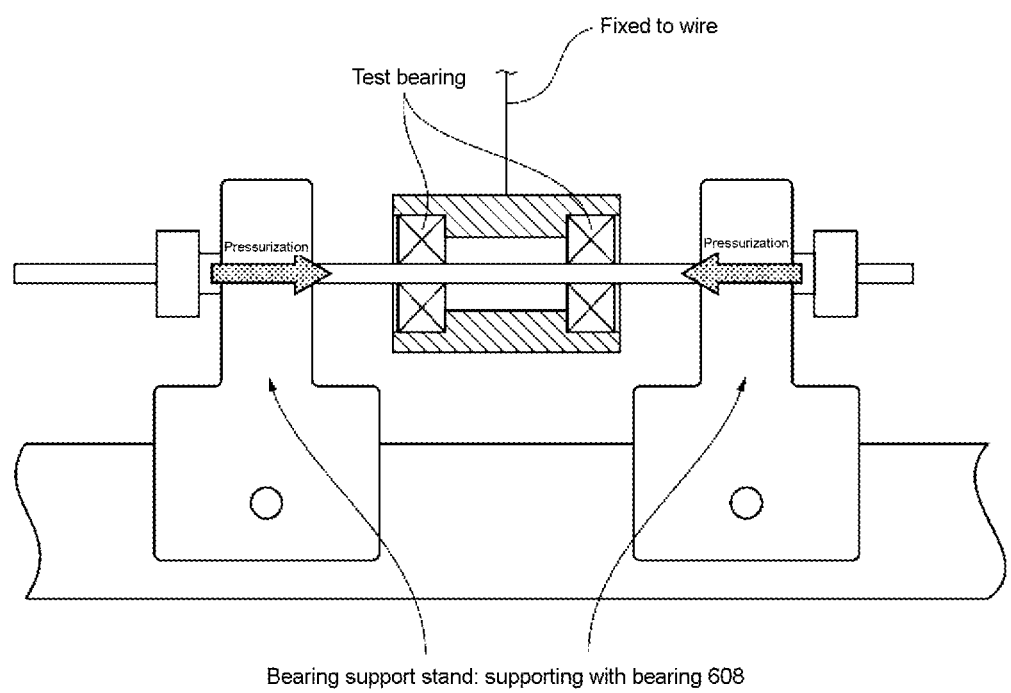

LUBRICANT COMPOSITION

CROSS REFERENCE TO RELATED APPLICATIONS

The present application is a continuation application of International Application No. PCT/JP2016/084911, filed on Nov. 25, 2016, which claims priority to Japanese Patent Application No. 2015-237554, filed on Dec. 4, 2015. The contents of these applications are incorporated herein by reference in their entirety.

BACKGROUND

Technical Field

The present disclosure relates to a lubricant composition, and more particularly relates to a lubricant composition which has sufficient fretting wear resistance, and can sufficiently inhibit leakage from bearings even when used under a high-temperature environment.

Background Art

Fluorine grease is excellent in durability at high temperatures, oxidation stability, chemical resistance, and low temperature performance, and is used under very harsh conditions. However, fluorine grease is expensive because its base oil and thickener are both fluorine-based, and, is not easily compatible with lubricating materials including metal, resins, rubber and the like. Also, the use of fluorine grease under heavy load conditions causes no oil film formation required for lubrication, results in fretting wear of bearings, and causes generation of unusual sound, increased vibration, and the like in some cases. Moreover, such fretting wear serves as a starting point to lead to more severe damage, which may result in bearing fracture or instrumental fracture.

In general, grease is problematic in that it is easily softened when used under a high-temperature environment and thus easily leaks from bearings when used as a lubricant for the bearings. Such the problem causes a decrease in the amount of grease within bearings, so as to shorten the life of the bearings.

For example, Japanese Patent Application Publication No. 2003-96480 discloses a lubricating grease composition incorporating non-fluorine-based synthetic oil in a fluorine-based lubricant, but does not study the fretting wear resistance and the prevention of leakage from bearings upon application under a high-temperature environment. Further, Japanese Patent Application Publication No. 2004-28326 discloses a grease composition prepared by mixing urea-based grease and fluorine-based grease at a mass ratio ranging from 40 to 80:60 to 20, but does not study the fretting wear resistance and insufficiently study the prevention of leakage from bearings upon application under a high-temperature environment. Furthermore, Japanese Patent Application Publication No. 2009-35590 discloses a grease composition with insufficient fretting wear resistance, which is prepared by mixing non-fluorine-based grease and fluorine-based grease, and does not sufficiently study the prevention of leakage from bearings upon application under a high-temperature environment.

Therefore, it is an object of the present disclosure to provide a lubricant composition having sufficient fretting wear resistance and being capable of sufficiently inhibiting leakage from bearings even when used under a high-temperature environment.

As a result of intensive studies, the present inventors have succeeded in producing a lubricant composition having sufficient fretting wear resistance, and being capable of sufficiently inhibiting leakage from bearings even when used under a high-temperature environment, and has completed the present disclosure. The lubricant composition comprises a perfluoropolyether as a base oil, a fluororesin as a thickener, and a polyol ester, a urea grease, and a zinc dialkyldithiophosphate as additives, wherein a mass ratio of content of the perfluoropolyether to total content of the polyol ester and the urea grease ranges from 78/22 to 95/5, a mass ratio of content of the perfluoropolyether to content of the polyol ester ranges from 90/10 to 96.5/3.5, a mass ratio of content of the polyol ester to content of the urea grease ranges from 40/60 to 65/35, content of the fluororesin ranges from 15 mass % to 24 mass % based on a total amount of the lubricant composition, and content of the zinc dialkyldithiophosphate ranges from 0.5 mass % to 4 mass % based on the total amount of the lubricant composition.

SUMMARY

Specifically, embodiments of the present disclosure relate to the following (1) to (4).

(1) A lubricant composition comprising:
a perfluoropolyether as a base oil;
a fluororesin as a thickener; and
a polyol ester, a urea grease and a zinc dialkyldithiophosphate as additives,
wherein a mass ratio of content of the perfluoropolyether to total content of the polyol ester and the urea grease ranges from 78/22 to 95/5;
a mass ratio of content of the perfluoropolyether to content of the polyol ester ranges from 90/10 to 96.5/3.5,
a mass ratio of content of the polyol ester to content of the urea grease ranges from 40/60 to 65/35,
content of the fluororesin ranges from 15 mass % to 24 mass % based on a total amount of the lubricant composition, and
content of the zinc dialkyldithiophosphate ranges from 0.5 mass % to 4 mass % based on the total amount of the lubricant composition.

(2) The lubricant composition according to (1), wherein the fluororesin is polytetrafluoroethylene.

(3) The lubricant composition according to (1), wherein the lubricant composition is used for a bearing of an automobile accessory.

(4) The lubricant composition according to (2), wherein the lubricant composition is used for a bearing of an automobile accessory.

(5) The lubricant composition according to (3), wherein the automobile accessory is an exhaust gas recirculation system, an electronic throttle control, an electric variable timing mechanism, or a variable nozzle turbo.

(6) The lubricant composition according to (4), wherein the automobile accessory is an exhaust gas recirculation system, an electronic throttle control, an electric variable timing mechanism, or a variable nozzle turbo.

Effects of Disclosure

The lubricant composition of the present disclosure has sufficient fretting wear resistance and can sufficiently inhibit leakage from bearings even when used under a high-temperature environment, so that it can be used as a lubricant for bearings for automobile accessories.

BRIEF DESCRIPTION OF DRAWINGS

FIG. 1(a) is a schematic longitudinal sectional diagram of a test machine when a fretting wear resistance test was conducted in Examples. Moreover, FIG. 1(b) is a schematic cross sectional diagram of the test machine, illustrating a supporting member and a shaft alone.

FIG. 2 is a schematic sectional diagram of a test machine when a leakage test was conducted in the Examples.

DESCRIPTION OF EMBODIMENTS

Hereinafter, embodiments of the present disclosure will be described in detail.

(Lubricant Composition)

The lubricant composition of an embodiment of the present disclosure comprises a perfluoropolyether (hereinafter referred to as "PFPE") as a base oil, a fluororesin as a thickener, a polyol ester, a urea grease and a zinc dialkyldithiophosphate (hereinafter referred to as a "ZnDTP") as additives. If necessary, various additives may further be blended therewith.

(Base Oil)

As PFPE to be used as a base oil, a compound represented by the following general formula (1) is preferably used.

$$RfO(CF_2O)_x(C_2F_4O)_y(C_3F_6O)_zRf \quad (1)$$

wherein a $CF_2O$ group, a $C_2F_4O$ group and a $C_3F_6O$ group are groups randomly bound in the main chain, Rf is a lower perfluoro-alkyl group having 1 to 5 carbon atom, preferably 1 to 3 carbon atom, such as a perfluoromethyl group, a perfluoroethyl group, and a perfluoropropyl group. Specifically, compounds represented by the following general formulae (2) to (5) can be preferably used.

$$RfO[CF(CF_3)CF_2O]_zRf \quad (2)$$

wherein Rf is as defined above, and z=2 to 200. This compound is obtained by completely fluorinating a precursor generated by subjecting hexafluoropropylene to photooxidation polymerization, or by subjecting hexafluoropropylene to anionic polymerization in the presence of a cesium fluoride catalyst, followed by treatment of the thus obtained acid fluoride compound having a terminal $CF(CF_3)COF$ group with fluorine gas.

$$RfO[CF(CF_3)CF_2O]_z(CF_2O)_xRf \quad (3)$$

wherein Rf is as defined above, x+z=3 to 200, and x:z=10:90 to 90:10. This compound is obtained by completely fluorinating a precursor generated by subjecting hexafluoropropene to photooxidation polymerization.

$$RfO(CF_2CF_2O)_y(CF_2O)_xRf \quad (4)$$

wherein Rf is as defined above, x+y=3 to 200, and x:y=10:90 to 90:10, and preferably, y/x>1. This compound is obtained by completely fluorinating a precursor generated by subjecting tetrafluoroethylene to photooxidation polymerization.

$$F(CF_2CF_2CF_2O)_{2-100}CF_2CF_3 \quad (5)$$

This compound is obtained by subjecting 2,2,3,3-tetrafluorooxetane to anionic polymerization in the presence of a cesium fluoride catalyst, and then treating the thus obtained fluorine-containing polyether $(CH_2CF_2CF_2O)_n$ with fluorine gas under ultraviolet irradiation at 160° C. to 300° C.

The above PFPE can be used singly or in mixture. The content of PFPE in the lubricant composition of the present embodiment ranges from preferably 61 mass % to 72 mass % in the total amount of the lubricant composition.

(Thickener)

The fluororesin to be used as a thickener is not particularly limited, and is preferably polytetrafluoroethylene (hereinafter referred to as "PTFE"), a tetrafluoroethylene/hexafluoropropylene copolymer (hereinafter referred to as "FEP"), or a vinylidene fluoride-propylene copolymer. PTFE to be used here is produced through production of a PTFE having a number average molecular weight Mn of about 1000 to 1000000 by subjecting tetrafluoroethylene to a process such as emulsion polymerization, suspension polymerization, or solution polymerization, and then treating the resulting PTFE by a process such as pyrolysis, decomposition under electron beam irradiation, γ-ray irradiation, or physical pulverization, so that the resulting PTFE has a number average molecular weight Mn of about 1000 to 500000. FEP to be used here is produced through production of an FEP a number average molecular weight Mn of about 1000 to 1000000 by subjecting tetrafluoroethylene and hexafluoropropylene to a process such as emulsion polymerization, suspension polymerization, or solution polymerization, and then treating the resultant FEP with a process such as pyrolysis, decomposition under electron beam irradiation, γ-ray irradiation, or physical pulverization, so that the resulting FEP has a number average molecular weight Mn of about 1000 to 500000. In addition, molecular weights can also be controlled using chain transfer agents upon copolymerization reaction. The thus obtained powdery fluororesin particles have generally a mean primary particle size of about 500 μm or less. Fluororesin particles to be used for this purpose have a mean primary particle size of preferably 1.0 μm or less. The mean primary particle size of higher than 1.0 μm may worsen oil separation at a high temperature and may deteriorate bearing torque characteristics.

The content of the thickener in the lubricant composition of the present embodiment ranges from 15 mass % to 24 mass %, and preferably 20 mass % to 24 mass % in the total amount of the lubricant composition. The content of the thickener that is less than 15 mass % in the total amount of the lubricant composition results in a softer composition, and worse oil separation. In contrast, the content of the thickener that is higher than 24 mass % in the total amount of the lubricant composition results in an excessively hard composition and deteriorated bearing torque characteristics.

(Additive)

The polyol ester to be used as an additive is obtained by, for example, esterification of polyhydric alcohol and monovalent carboxylic acid. Examples of polyhydric alcohol include ethylene glycol, diethylene glycol, triethylene glycol, tetraethylene glycol, 1,2-propylene glycol, 1,3-propylene glycol, dipropylene glycol, 2-methyl-1,3-propanediol, 1,2-butanediol, 1,3-butanediol, 1,4-butanediol, neopentyl glycol, 1,6-hexanediol, 1,8-octanediol, 1,10-decanediol, glycerin, trimethylolmethane, trimethylolethane, trimethylolpropane, trimethylolbutane, 1,2,6-hexanetriol, and pentaerythritol, and preferably neopentyl glycol, and trimethylolpropane. Furthermore, examples of monovalent carboxylic acid include $C_5$-$C_{18}$ linear or branched fatty acid, and preferably, lauric acid, palmitic acid, and stearic acid. These alcohols and carboxylic acids can be used singly or in mixture.

The urea grease to be used as an additive contains, for example, an ester oil as a base oil, and a urea compound as a thickener. The base oil may contain poly α-olefin (PAO) or a mineral oil. Specific examples of the ester oil include a diester, a polyol ester, and an aromatic ester. Examples of the aromatic ester include a trimellitic acid ester, and a pyromellitic acid ester. These aromatic esters may be used singly or in mixture. Specific examples of the urea compound include diurea compounds such as an aliphatic diurea compound, an alicyclic diurea compound, and an aromatic diurea compound, a triurea compound, and a tetraurea compound. These urea compounds can be used singly or in mixture.

The mass ratio of the content of PFPE to the total content of the polyol ester and the urea grease in the lubricant composition of the present embodiment ranges from 78/22 to 95/5. The content of PFPE that is less than 78 mass % based on the total content of PFPE, the polyol ester and the urea grease, which is 100 mass %, results in a shorter bearing life. In contrast, the content of PFPE that is higher than 95 mass % based on the total content of PFPE, the polyol ester and the urea grease, which is 100 mass %, results in decreased fretting wear resistance.

The mass ratio of the content of PFPE to the content of the polyol ester in the lubricant composition of the present embodiment ranges from 90/10 to 96.5/3.5. The content of PFPE that is less than 90 mass % based on the total content of PFPE and the polyol ester, which is 100 mass %, may cause leakage from bearings or may shorten the bearing life when used under a high-temperature environment. In contrast, the content of PFPE that is higher than 96.5 mass % based on the total content of PFPE and the polyol ester, which is 100 mass %, results in decreased fretting wear resistance.

The mass ratio of the content of the polyol ester and the content of the urea grease in the lubricant composition of the present embodiment ranges from 40/60 to 65/35. The content of the polyol ester that is less than 40 mass % based on the total content of the polyol ester and the urea grease, which is 100 mass %, results in decreased fretting wear resistance. In contrast, the content of the polyol ester that is higher than 65 mass % based on the total content of the polyol ester and the urea grease, which is 100 mass %, results in leakage from bearings when used under a high-temperature environment.

Furthermore, an example of ZnDTP to be used as an additive is ZnDTP represented by the following general formula (6).
[Chemical formula 1]

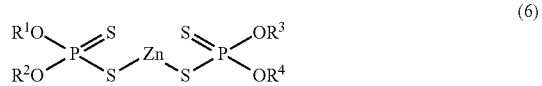

(6)

In the formula (6), $R^1$, $R^2$, $R^3$ and $R^4$ each independently denote a hydrocarbon group. Examples of such a hydrocarbon group include a linear or branched alkyl group, or aryl group, and are preferably alkyl groups among these groups. Also, the number of carbon atoms of a hydrocarbon group is preferably 8 or more, and is preferably 18 or less, and further preferably 12 or less. Such an alkyl group is preferably primary or secondary, or a mixture thereof, and is more preferably secondary.

The content of ZnDTP of the present embodiment ranges from 0.5 mass % to 4 mass % and preferably ranges from 1.5 mass % to 3 mass % in the total amount of the lubricant composition. The content of ZnDTP that is less than 0.5 mass % in the total amount of the lubricant composition results in decreased fretting wear resistance. In contrast, the content of ZnDTP that is higher than 4 mass % in the total amount of the lubricant composition tends to cause leakage from bearings.

The lubricant composition of the present embodiment can further be blended with additives such as an antioxidant, an anticorrosive, a corrosion inhibitor, a wear preventing agent, an oil agent, a solid lubricant, an extreme pressure agent, and a conductivity-improving agent, as necessary.

Examples of the antioxidant include phenol-based antioxidants such as 2,6-di-tert-butyl-4-methylphenol, 4,4'-methylenebis(2,6-di-tert-butylphenol), amine-based antioxidants such as alkyldiphenylamine, triphenylamine, phenyl-α-naphthylamine, phenothiazine, alkylated phenyl-α-naphthylamine, and alkylated phenothiazine, and furthermore, phosphoric acid-based antioxidants, and sulfur-based antioxidants.

Examples of the anticorrosive include fatty acid, fatty acid amine, alkylsulfonic acid metal salt, alkyl sulfonic acid amine salt, oxidized paraffin, and polyoxyethylene alkyl ether.

Examples of the corrosion inhibitor include benzotriazole, benzimidazole, thiadiazole, and sodium sebacate. The blending percentage of the anticorrosive or the corrosion inhibitor ranges from preferably 0.5 mass % to 5 mass % in the lubricant composition of the present embodiment.

Examples of the wear preventing agent include phosphorus-based compounds such as phosphoric ester, phosphite, and phosphoric ester amine salt, sulfur compounds such as sulfides and disulfides, sulfur-based metal salts such as a dialkyldithiophosphate metal salt, and a dialkyldithiocarbamate metal salt, and chlorine compounds such as chlorinated paraffin and chlorinated diphenyl. The blending percentage of the wear preventing agent preferably ranges from 0.5 mass % to 5 mass % in the lubricant composition of the present embodiment.

Examples of the oil agent include fatty acid or its ester, higher alcohol, polyhydric alcohol or its ester, aliphatic ester, aliphatic amine, fatty acid monoglyceride, montan wax, and amide-based wax.

Examples of the solid lubricant include molybdenum disulfide, carbon black, graphite, boron nitride, silane nitride, and melamine cyanurate.

(Method for Producing Lubricant Composition)

According to the method for producing the lubricant composition of the present embodiment, the lubricant composition is produced by mixing PFPE as a base oil, the fluororesin as a thickener, and ZnDTP, the polyol ester and the urea grease as additives. In addition, all materials; that is, the above base oil, thickener and additives, may be added and mixed simultaneously, or these materials may be mixed while separately adding them sequentially, or some of these materials may be preliminarily mixed and then these materials may be mixed finally. Moreover, in view of further enhancing the uniformity and stability of the lubricant composition, the lubricant composition is preferably produced by mixing in advance the fluororesin as a thickener with PFPE as a base oil to prepare fluorine grease, and then adding ZnDTP, the polyol ester and the urea grease as additives to the fluorine grease for mixing.

Furthermore, materials are mixed in the present embodiment using a three-roll mill or a high pressure homogenizer, for example. As such a three-roll mill, a hydraulic mill is generally used.

The lubricant composition of the present embodiment contains the polyol ester at a predetermined blending ratio, so as to be excellent in fretting wear resistance under micro-reciprocation. Moreover, the lubricant composition of the present embodiment contains the urea grease at a predetermined blending ratio, so as to be able to sufficiently inhibit leakage from bearings, even when used under a high-temperature environment.

The lubricant composition of the present embodiment is used for internal combustion engines and mechanical slide units to be used around the engines in transport devices, and particularly for bearings for automobile accessories. Examples of bearings include bearings to be used for peripheral accessories of automobile engines (exhaust gas recirculation (EGR) system, electronic throttle control (ETC), electric variable timing mechanism (VVT), variable nozzle turbo (VNT), electric fan motor, and alternator). The lubricant composition is particularly preferably used for exhaust gas recirculation (EGR) system, electronic throttle control (ETC), electric variable timing mechanism (VVT), and variable nozzle turbo (VNT).

The embodiments of the present disclosure are as described above. However, the present disclosure is not limited to the above embodiments and encompasses all aspects included in the concept of the present disclosure and the scope of claims, and can be varied within the scope of the present disclosure.

EXAMPLES

Hereinafter, the present disclosure is further described in detail based the Examples, but, the present disclosure is not limited to the Examples.

[1] Raw Materials
<Base Oil>
(A) PFPE:
FOMBLIN M15 (Solvay Solexis, Inc.)
Above general formula (4)
Structural formula $CF_3O(CF_2CF_2O)_y(CF_2O)_xCF_3$ (where y/x>1)
40° C. kinematic viscosity: 90 mm$^2$/s
<Thickener>
(b) PTFE:
Algoflon L101 (Solvay Solexis, Inc.)
Mean primary particle size 0.1 to 0.2 μm
<Additive>
(c) Polyol Ester:
Synative ES TMTC (BASF Japan)
Fatty acid ester of trimethylolpropane
40° C. kinematic viscosity: 20 mm$^2$/s
(d) Grease Additive (Urea-Based Grease)
Urea Grease 1:
First, a predetermined amount of an aromatic ester (40° C. kinematic viscosity: 100 mm$^2$/s, Priolube1940 Croda) was prepared as a base oil, and then divided into two portions. One portion was mixed with a predetermined amount of 4,4'-diphenylmethane diisocyanate and the other portion was mixed with a predetermined amount of octylamine. They were further mixed together. The temperature of the thus obtained mixture was increased to 190° C., and then 4,4'-diphenylmethane diisocyanate was reacted with octylamine, so that an aliphatic diurea compound was generated. Subsequently, the compound was cooled to room temperature and kneaded twice using a three-roll mill. Urea grease 1 was obtained by blending the aromatic ester with the aliphatic diurea compound. In addition, the blending percentage of the aliphatic diurea compound was 15 mass % in the urea grease 1.

Urea Grease 2:
Except for using, instead of the aromatic ester, a base oil mixture (40° C. kinematic viscosity: 25 mm$^2$/s) of a diester (DOS (bis2-(ethylhexyl) sebacate, Daihachi Chemical Industry Co., Ltd.) and PAO (SpectraSyn 4, Exxon Mobil Corporation), urea grease 2 was obtained by blending an aliphatic diurea compound in the base oil mixture of the diester and PAO in a manner similar to that for the urea grease 1. In addition, the blending percentage of the aliphatic diurea compound was 15 mass % in the urea grease 2.

Urea Grease 3:
Except for generating an aromatic diurea compound by reacting 4,4'-diphenylmethane diisocyanate with aniline using a polyol ester (40° C. kinematic viscosity: 150 mm$^2$/s, Unistar H481D, NOF CORPORATION) instead of the aromatic ester, and aniline instead of octylamine, urea grease 3 was obtained by blending the polyol ester with the aromatic diurea compound in a manner similar to that for the urea grease 1. In addition, the blending percentage of the aromatic diurea compound was 15 mass % in the urea grease 3.

(f) Grease Additive (Soap-Based Grease)
Lithium Soap Grease:
An oil mixture of a diester and PAO (40° C. kinematic viscosity: 25 mm$^2$/s) was blended with a lithium soap compound S-7000 (Sakai Chemical Industry Co., Ltd.), so that the content % in lithium soap grease was 15 mass %. The resultant was kneaded twice using a three-roll mill, so as to prepare the grease.

Lithium Complex (Li-C) Soap Grease:
An oil mixture of the diester and PAO (40° C. kinematic viscosity: 25 mm$^2$/s) was blended with a lithium complex soap compound (a reactant of hydroxystearic acid and aliphatic dicarboxylic acid and LiOH), so that the content % in lithium soap grease was 20 mass %. The resultant was kneaded twice using a three-roll mill, so as to prepare the grease.

Barium Complex (Ba-C) Soap Grease:
An oil mixture of the diester and PAO (40° C. kinematic viscosity: 25 mm$^2$/s) was blended with a barium complex soap compound (a reactant of alkylamine and aliphatic dicarboxylic acid and Ba(OH)$_2$), so that the content % in barium soap grease was 30 mass %. The resultant was kneaded twice using a three-roll mill, so as to prepare the grease.

(e) ZnDTP:
Additin RC 3180 (Rhein Chemie)
Liquid
Corrosion Inhibitor: Irgacor DSSG (BASF Japan) Sodium Sebacate

[2] Preparation of Lubricant Composition
The above base oils, thickeners and additives were added, so that blending ratios in Tables 1 to 4 were achieved, followed by kneading using a three-roll mill. Thus uniform lubricant compositions were obtained (Examples 1 to 8, and Comparative Examples 1 to 10).

[3] Test and Evaluation of Lubricant Composition
The thus obtained lubricant compositions (Examples 1 to 8, Comparative Examples 1 to 10) were evaluated as follows. The results are shown in Tables 1 to 4.

<Fretting Wear Resistance Test>
As test bearings, non-contact rubber sealed deep groove ball bearings having an inner diameter of 8 mm, an outer diameter of 22 mm, and a width of 7 mm were used. The test was conducted by adding 0.15 mL of each lubricant composition to the test bearing in a test machine shown in FIG. 1(a), and oscillating the test machine into the direction indicated in FIG. 1(b) for 72 hours under conditions of the temperature of the bearing outer ring of 25° C., a thrust load of 20N, a frequency of 20 Hz, an oscillation angle of 0.3°. In addition, the thrust load was applied with a weight shown in FIG. 1(a).

After the completion of the test, a wear depth (μm) of the wear tracks on the bearing inner ring was measured. The wear depth was determined by measuring the depth of the center of a part that had been worn-out to the highest degree among wear tracks formed on the rolling surface of the bearing inner ring. In addition, in the Examples, a case where the wear depth was less than 1.0 μm was determined to be good.

<Leakage Test (Bearing Rotation Test)>

As test bearings, non-contact rubber sealed deep groove ball bearings having an inner diameter of 8 mm, an outer diameter of 22 mm, and a width of 7 mm were used. The test was conducted by supporting a shaft with bearings of both bearing support stands of a test machine shown in FIG. 2, adding 0.15 mL of each lubricant composition to the test bearings, and then rotating the shaft for 50 hours under conditions of the rotational speed of the inner ring of 3000 rpm, the temperature of the bearing outer ring of 180° C., and a thrust load of 39.2 N. In addition, the thrust load was applied by pressurization from both sides of the shaft.

After the completion of the test, the presence or the absence of leakage from the bearings was visually confirmed. A case of no leakage was determined to be "○ (Good)", and a case of the presence of leakage was determined to be "x (Poor)".

TABLE 1

|  |  | Example 1 | Example 2 | Example 3 | Example 4 | Comparative Example 1 | Comparative Example 2 |
|---|---|---|---|---|---|---|---|
| Base oil | (a) PFPE | 68.8 | 65.1 | 62.8 | 68.0 | 70.4 | 60.6 |
| Thickener | (b) PTFE | 23.1 | 21.8 | 21.1 | 22.9 | 23.5 | 20.3 |
| Additive | (c) Polyol ester | 2.5 | 5 | 6.5 | 2.5 | 1.5 | 8 |
|  | (d) Urea grease 1 | 2.5 | 5 | 6.5 | 2.5 | 1.5 | 8 |
|  | (e) ZnDTP | 2 | 2 | 2 | 3.0 | 2 | 2 |
|  | DSSG | 1.1 | 1.1 | 1.1 | 1.1 | 1.1 | 1.1 |
|  | (a)/(c + d) | 93.2/6.8 | 86.7/13.3 | 82.8/17.2 | 93.2/6.8 | 95.9/4.1 | 79.1/20.9 |
|  | (a)/(c) | 96.5/3.5 | 92.9/7.1 | 90.6/9.4 | 96.5/3.5 | 97.9/2.1 | 88.3/11.7 |
|  | (c)/(d) | 50/50 | 50/50 | 50/50 | 50/50 | 50/50 | 50/50 |
| Fretting (wear depth [μm]) |  | 0.5 | 0.5 | 0.4 | 0.5 | 1.4 | 0.4 |
| Leakage |  | ○ | ○ | ○ | ○ | ○ | x |

(Note)
Underlined boldface numbers in this Table indicate that they are out of the appropriate range of the present disclosure.

TABLE 2

|  |  | Example 5 | Example 2 | Example 6 | Comparative Example 3 | Comparative Example 4 |
|---|---|---|---|---|---|---|
| Base oil | (a) PFPE |  |  | 65.1 |  |  |
| Thickener | (b) PTFE |  |  | 21.8 |  |  |
| Additive | (c) Polyol ester | 4 | 5 | 6.5 | 2.5 | 7 |
|  | (d) Urea grease 1 | 6 | 5 | 3.5 | 7.5 | 3 |
|  | (e) ZnDTP |  |  | 2 |  |  |
|  | DSSG |  |  | 1.1 |  |  |
|  | (a)/(c + d) | 86.7/13.3 | 86.7/13.3 | 86.7/13.3 | 86.7/13.3 | 86.7/13.3 |
|  | (a)/(c) | 94.2/5.8 | 92.9/7.1 | 90.9/9.1 | 96.3/3.7 | 90.3/9.7 |
|  | (c)/(d) | 40/60 | 50/50 | 65/35 | 25/75 | 70/30 |
| Fretting (wear depth [μm]) |  | 0.6 | 0.5 | 0.5 | 1.2 | 0.4 |
| Leakage |  | ○ | ○ | ○ | ○ | x |

(Note)
Underlined boldface numbers in this Table indicate that they are out of the appropriate range of the present disclosure.

TABLE 3

|  |  | Example 2 | Example 7 | Example 8 | Comparative Example 5 | Comparative Example 6 | Comparative Example 7 |
|---|---|---|---|---|---|---|---|
| Base oil | (a) PFPE |  |  |  | 65.1 |  |  |
| Thickener | (b) PTFE |  |  |  | 21.8 |  |  |
| Additive | (c) Polyol ester |  |  |  | 5 |  |  |
|  | (d) Urea grease 1 | 5 | 0 | 0 | 0 | 0 | 0 |
|  | Urea grease 2 | 0 | 5 | 0 | 0 | 0 | 0 |
|  | Urea grease 3 | 0 | 0 | 5 | 0 | 0 | 0 |
|  | (f) Li soap grease | 0 | 0 | 0 | 5 | 0 | 0 |
|  | Li—C grease | 0 | 0 | 0 | 0 | 5 | 0 |
|  | Ba—C grease | 0 | 0 | 0 | 0 | 0 | 5 |
|  | (e) ZnDTP |  |  |  | 2 |  |  |
|  | DSSG |  |  |  | 1.1 |  |  |

TABLE 3-continued

|  | Example 2 | Example 7 | Example 8 | Comparative Example 5 | Comparative Example 6 | Comparative Example 7 |
|---|---|---|---|---|---|---|
| (a)/(c + d) | 86.7/13.3 | 86.7/13.3 | 86.7/13.3 | 86.7/13.3 | 86.7/13.3 | 86.7/13.3 |
| (a)/(c) | 92.9/7.1 | 92.9/7.1 | 92.9/7.1 | 92.9/7.1 | 92.9/7.1 | 92.9/7.1 |
| (c)/(d) | 50/50 | 50/50 | 50/50 | __100/0__ | __100/0__ | __100/0__ |
| Fretting (wear depth [μm]) | 0.5 | 0.5 | 0.7 | 0.5 | 0.6 | 0.6 |
| Leakage | ○ | ○ | ○ | __x__ | __x__ | __x__ |

(Note)
Underlined boldface numbers in this Table indicate that they are out of the appropriate range of the present disclosure.

TABLE 4

|  |  | Comparative Example 8 | Comparative Example 9 | Comparative Example 10 |
|---|---|---|---|---|
| Base oil | (a) PFPE | 65.1 | 68.4 | 68.4 |
| Thickener | (b) PTFE | __26.8__ | 23 | 23 |
| Additive | (c) Polyol ester | 5 | 7.5 | 5.5 |
|  | (d) Urea grease 1 | __0__ | __0__ | __0__ |
|  | (e) ZnDTP | 2 | __0__ | 2 |
|  | DSSG | 1.1 | 1.1 | 1.1 |
|  | (a)/(c + d) | 92.9/7.1 | 90.1/9.9 | 92.6/7.4 |
|  | (a)/(c) | 92.9/7.1 | 90.1/9.9 | 92.6/7.4 |
|  | (c)/(d) | __100/0__ | __100/0__ | __100/0__ |
| Fretting (wear depth [μm]) |  | 0.6 | __2__ | 0.5 |
| Leakage |  | __x__ | __x__ | __x__ |

(Note)
Underlined boldface numbers in this Table indicate that they are out of the appropriate range of the present disclosure.

As shown in Tables 1 to 3, the lubricant compositions according to Examples 1 to 8 were confirmed to be excellent in fretting wear resistance and cause no leakage from bearings even when used under a high-temperature environment, since the mass ratio (a)/(c+d) of the content of PFPE to the total content of the polyol ester and the urea grease, the mass ratio (a)/(c) of the content of PFPE to the content of the polyol ester, the mass ratio (c)/(d) of the content of the polyol ester to the content of the urea grease, the content (b) of PTFE, the fluororesin, and the content (e) of the zinc dialkyldithiophosphate (ZnDTP) were all within the appropriate range of the present disclosure.

In contrast, as shown in Table 1, the lubricant composition according to Comparative Example 1 was found to be inferior in fretting wear resistance to the others, since the content of PFPE was higher than 95 mass % based on the total content, 100 mass %, of PFPE, the polyol ester and the urea grease, and the content of PFPE was higher than 96.5 mass % based on the total content, 100 mass %, of PFPE and the polyol ester. Moreover, the lubricant composition according to Comparative Example 2 was found to cause leakage from bearings when used under a high-temperature environment, since the content of PFPE was less than 90 mass % based on the total content, 100 mass %, of PFPE and the polyol ester.

Furthermore, as shown in Table 2, the lubricant composition according to Comparative Example 3 was inferior in fretting wear resistance to the others, since the content of the polyol ester was less than 40 mass % based on the total content, 100 mass %, of the polyol ester and the urea grease. The lubricant composition according to Comparative Example 4 was found to cause leakage from bearings when used under a high-temperature environment, since the content of the polyol ester was higher than 65 mass % based on the total content, 100 mass %, of the polyol ester and the urea grease.

Table 3 shows comparisons of grease additives, specifically between urea-based grease (d) and soap-based grease (f) under the same conditions where the content was 5 mass % in the total amount of each lubricant composition. Examples 2, 7 and 8 contained different urea-based grease (d) additives, and Comparative Examples 5 to 7 contained different soap-based grease (f) additives. In Examples 2, 7 and 8, where the mass ratios (c)/(d) of the content of the polyol ester to the content of the urea grease were within the range of 40/60 to 65/35, no leakage occurred regardless of urea grease types. On the other hand, in Comparative Examples 5 to 7, where (c)/(d) was 100/0 which was higher than 65/35, all soap-based grease (f) additives were found to result in leakage from bearings upon application under a high-temperature environment.

Furthermore, as shown in Table 4, the lubricant composition according to Comparative Example 8 was found to cause leakage from bearings when used under a high-temperature environment, since the content of PTFE, the fluororesin, was higher than 24 mass % based on the total amount of the lubricant composition, and no urea grease was contained. Moreover, the lubricant composition according to Comparative Example 9 was inferior in fretting wear resistance to the others and found to cause leakage from bearings when used under a high-temperature environment, since it contained no urea grease and no zinc dialkyldithiophosphate (ZnDTP). Moreover, the lubricant composition according to Comparative Example 10 was found to cause leakage from bearings when used under a high-temperature environment, since it contained no urea grease.

The lubricant composition of the present disclosure can be used for lubrication applications requiring heat resistance, lubricity, and durability life.

For example, the lubricant composition can be used for internal combustion engines and mechanical slide units to be used around such engines in transport devices, and particularly for bearings for automobile accessories. In particular, the lubricant composition can be used for bearings to be used for peripheral accessories of automobile engines (exhaust gas recirculation (EGR) system, electronic throttle control (ETC), electric variable timing mechanism (VVT), variable nozzle turbo (VNT), electric fan motor, and alternator).

What is claimed is:
1. A lubricant composition comprising:
a perfluoropolyether as a base oil;
a fluororesin as a thickener; and
a polyol ester, a urea grease and a zinc dialkyldithiophosphate as additives the urea grease comprising an ester oil and a urea compound,
wherein a mass ratio of content of the perfluoropolyether to total content of the polyol ester and the urea grease ranges from 82.8:17.2 to 93.2:6.8;
a mass ratio of content of the perfluoropolyether to content of the polyol ester ranges from 90/10 to 96.5/3.5, a mass ratio of content of the polyol ester to content of the urea grease ranges from 40/60 to 65/35, content of the fluororesin ranges from 15 mass % to 24 mass % based on a total amount of the lubricant composition, and content of the zinc dialkyldithiophosphate ranges from 0.5 mass % to 4 mass % based on the total amount of the lubricant composition.

2. The lubricant composition according to claim 1, wherein the fluororesin is polytetrafluoroethylene.

3. The lubricant composition according to claim 1, wherein the lubricant composition is used for a bearing of an automobile accessory.

4. The lubricant composition according to claim 2, wherein the lubricant composition is used for a bearing of an automobile accessory.

5. The lubricant composition according to claim 3, wherein the automobile accessory is an exhaust gas recirculation system, an electronic throttle control, an electric variable timing mechanism, or a variable nozzle turbo.

6. The lubricant composition according to claim 4, wherein the automobile accessory is an exhaust gas recirculation system, an electronic throttle control, an electric variable timing mechanism, or a variable nozzle turbo.

7. The lubricant composition according to claim 1, wherein the ester oil is a diester or an aromatic ester.

8. The lubricant composition according to claim 1, wherein the ester oil is different from the polyol ester.

* * * * *

UNITED STATES PATENT AND TRADEMARK OFFICE
CERTIFICATE OF CORRECTION

PATENT NO. : 10,633,608 B2  
APPLICATION NO. : 15/995244  
DATED : April 28, 2020  
INVENTOR(S) : Takeshi Hishinuma et al.

Page 1 of 1

It is certified that error appears in the above-identified patent and that said Letters Patent is hereby corrected as shown below:

On the Title Page

Insert, Item (30):
-- Foreign Application Priority Data
Dec. 4, 2015 (JP)..............................2015-237554 --

Signed and Sealed this
Seventh Day of July, 2020

Andrei Iancu
*Director of the United States Patent and Trademark Office*